United States Patent
Guen (10) Patent No.: US 9,985,272 B2
(45) Date of Patent: May 29, 2018

(54) RECHARGEABLE BATTERY

(71) Applicant: SAMSUNG SDI CO., LTD., Yongin-si, Gyeonggi-do (KR)

(72) Inventor: Min-Hyung Guen, Yongin-si (KR)

(73) Assignee: SAMSUNG SDI CO., LTD., Yongin-Si, Gyeonggi-Do (KR)

( * ) Notice: Subject to any disclaimer, the term of this patent is extended or adjusted under 35 U.S.C. 154(b) by 153 days.

(21) Appl. No.: 15/196,557

(22) Filed: Jun. 29, 2016

(65) Prior Publication Data

US 2017/0149047 A1    May 25, 2017

(30) Foreign Application Priority Data

Nov. 24, 2015    (KR) .................... 10-2015-0164802

(51) Int. Cl.
*H01M 2/36*    (2006.01)
*H01M 2/02*    (2006.01)
(Continued)

(52) U.S. Cl.
CPC .......... *H01M 2/365* (2013.01); *H01M 2/026* (2013.01); *H01M 2/0262* (2013.01); *H01M 2/0285* (2013.01); *H01M 2/043* (2013.01); *H01M 2/0404* (2013.01); *H01M 2/0486* (2013.01); *H01M 2/1294* (2013.01); *H01M 2/30* (2013.01);
(Continued)

(58) Field of Classification Search
CPC ........ H01M 2/36; H01M 2/365; H01M 2/368; H01M 2/026; H01M 2/0262; H01M 2/0285; H01M 2/0404; H01M 2/043; H01M 2/0486; H01M 2/1294; H01M 2/30; H01M 2/305; H01M 2/361; H01M 2/362; H01M 10/0431; H01M 2220/20; H01M 2220/30
See application file for complete search history.

(56) References Cited

U.S. PATENT DOCUMENTS

| | | | |
|---|---|---|---|
| 2012/0070697 A1 | 3/2012 | Baek et al. | |
| 2012/0088147 A1* | 4/2012 | Moon | H01M 2/0217 429/179 |

(Continued)

FOREIGN PATENT DOCUMENTS

| | | | | |
|---|---|---|---|---|
| EP | 2355203 A1 * | 8/2011 | .......... | H01M 2/0275 |
| JP | 2015076293 A * | 4/2015 | | |

(Continued)

*Primary Examiner* — Gregg Cantelmo
(74) *Attorney, Agent, or Firm* — Lee & Morse, P.C.

(57) ABSTRACT

A rechargeable battery according to an exemplary embodiment may include: an electrode assembly including an electrode provided with a coated region and an uncoated region tab at opposite sides of a separator and configured to be spirally wound; an insulating case to accommodate and electrically insulate the electrode assembly; a case to accommodate the insulating case; and a cap plate including an electrolyte injection opening for injecting an electrolyte solution and combined with an opening of the case, wherein the insulating case may include: an internal electrolyte injection opening corresponding to the electrolyte injection opening; a pillar around the internal electrolyte injection opening protruding toward an inner side of the cap plate; and a valve flap that rotates via a hinge, induces injection of the electrolyte solution, and prevents backflow of the electrolyte solution.

14 Claims, 11 Drawing Sheets

(51) Int. Cl.
  *H01M 2/04* (2006.01)
  *H01M 2/12* (2006.01)
  *H01M 2/30* (2006.01)
  *H01M 10/04* (2006.01)

(52) U.S. Cl.
  CPC ........... *H01M 2/305* (2013.01); *H01M 2/361* (2013.01); *H01M 2/362* (2013.01); *H01M 10/0431* (2013.01); H01M 2220/20 (2013.01); H01M 2220/30 (2013.01)

(56) References Cited

U.S. PATENT DOCUMENTS

2015/0044529 A1    2/2015  Yun
2015/0357624 A1*  12/2015  Yamafuku ............... H01M 2/36
                                                        429/83

FOREIGN PATENT DOCUMENTS

KR    10-2012-0029080 A    3/2012
KR    10-2015-0017624 A    2/2015

* cited by examiner

RECHARGEABLE BATTERY

CROSS-REFERENCE TO RELATED APPLICATION

Korean Patent Application No. 10-2015-0164802, filed on Nov. 24, 2015, in the Korean Intellectual Property Office, and entitled: "Rechargeable Battery," is incorporated by reference herein in its entirety.

BACKGROUND

1. Field

Exemplary embodiments relate to a rechargeable battery in which an electrode assembly is insulated by an insulating case inside a case thereof.

2. Description of the Related Art

A rechargeable battery differs from a primary battery in that it can be repeatedly charged and discharged, while the latter is incapable of being recharged. Low-capacity rechargeable batteries are used in small electronic devices such as mobile phones, laptop computers, and camcorders, while large-capacity rechargeable batteries can be used as a power source for driving motors of a hybrid vehicle, an electric vehicle, and the like.

SUMMARY

Exemplary embodiments provides a rechargeable battery that may include: an electrode assembly including an electrode provided with a coated region and an uncoated region tab at opposite sides of a separator and configured to be spirally wound; an insulating case to accommodate and electrically insulate the electrode assembly: a case to accommodate the insulating case; and a cap plate including an electrolyte injection opening for injecting an electrolyte solution and combined with an opening of the case, wherein the insulating case may include: an internal electrolyte injection opening corresponding to the electrolyte injection opening; a pillar around the internal electrolyte injection opening protruding toward an inner side of the cap plate; and a valve flap that rotates via a hinge, induces injection of the electrolyte solution, and prevents backflow of the electrolyte solution.

The valve flap may be a plurality of valve flaps around the internal electrolyte injection opening and along a circumferential direction of the internal electrolyte injection opening.

An electrolyte solution accommodating line may connect the pillar and the valve flaps to accommodate the injected electrolyte solution and may maintain a predetermined gap from a circumference of the electrolyte injection opening.

The plurality of valve flaps may be disposed to be tilted from the hinge toward the internal electrolyte injection opening and to have a wide passage at a side of the electrolyte injection opening and a narrow passage at a side of the internal electrolyte injection opening to induce the injection of the electrolyte solution when the electrolyte solution is injected into the electrolyte injection opening.

When the electrolyte solution flows backward from the internal electrolyte injection opening, the backflow of the electrolyte solution may cause the plurality of valve flaps to close the electrolyte injection opening.

The hinge may connect the plurality of valve flaps to the pillar and is supported by the cap plate, and the cap plate may face the insulating case.

The pillar may be a plurality of pillars, and the plurality of valve flaps may be between the plurality of pillars and overlap each other at the electrolyte injection opening when the electrolyte solution flows backward from the internal electrolyte injection opening.

The hinge may connect plurality of valve flaps to the pillar and be spaced apart from the cap plate by a predetermined gap, and the cap plate may face the insulating case.

The valve flaps may be include a protrusion at a stepped portion thereof corresponding to the predetermined gap, the pillar may be a plurality of pillars, and the plurality of valve flaps may be between the plurality of pillars and are supported by the protrusion at the electrolyte injection opening when the electrolyte solution flows backward from the internal electrolyte injection opening.

In an internal space of the case including the cap plate, the insulating case may be toward a bottom and lateral walls of the case and an inner side of the cap plate to accommodate the electrode assembly, and the insulating case may be provided with a tab hole, corresponding to the uncoated region tab, and an internal vent hole, corresponding to a vent hole of the cap plate.

The uncoated region tab may be connected to an electrode terminal provided in a terminal hole of the cap plate outside of the insulating case.

The pillar may be a plurality of pillars provided around the internal electrolyte injection opening on one side, the uncoated region tab and the electrode terminal also connected on the one side, and the valve flap may be a plurality of valve flaps that block an interval between the internal electrolyte injection opening and the tab hole.

The insulating case may be one member bent to accommodate the electrode assembly, and be provided with the pillar and the valve flap at one surface thereof.

The insulating case may include: a first surface portion that faces the cap plate and is provided with the internal electrolyte injection opening, the pillar, and the valve flap; a second surface portion and a third surface portion that extend from and are bent from the first surface portion to face opposite sides of the electrode assembly; and a fourth surface portion, a fifth surface portion, and a sixth surface portion that protrude from outside the second surface portion and the third surface portion, and face a lateral surface of the electrode assembly and a portion opposite to the uncoated region tab.

BRIEF DESCRIPTION OF THE DRAWINGS

Features will become apparent to those of ordinary skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 1:
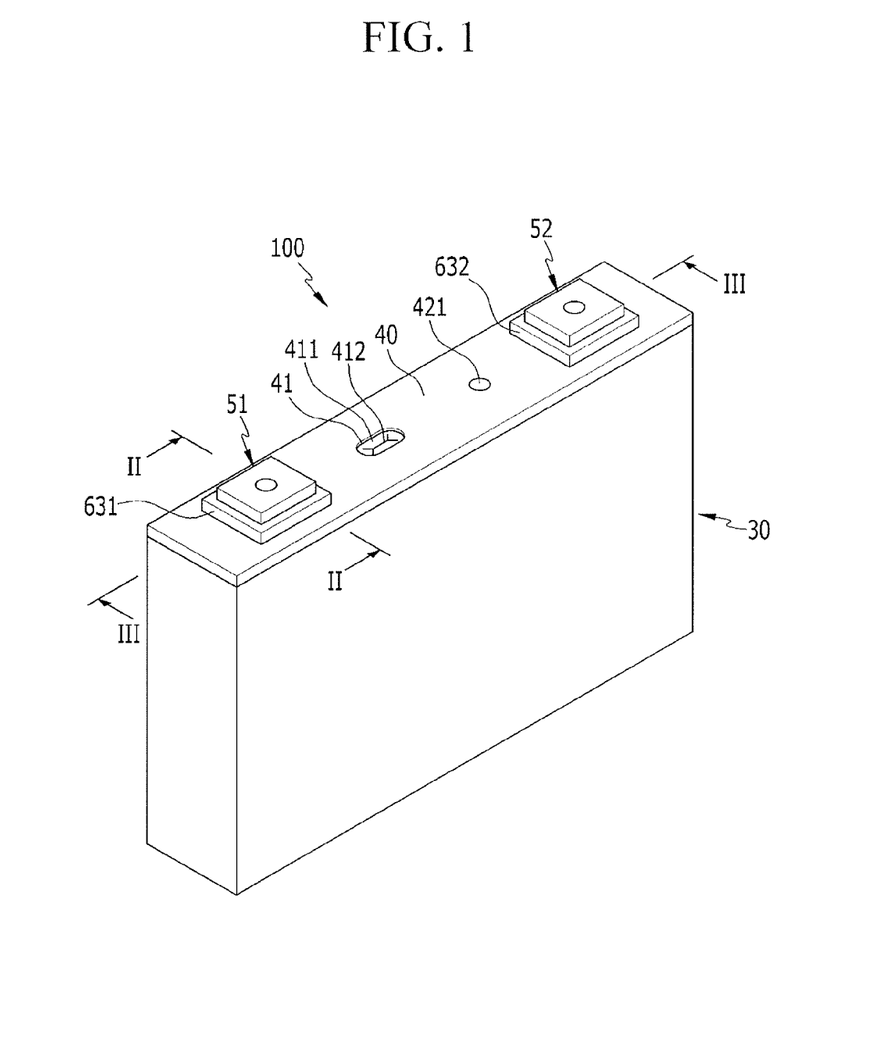
FIG. 1 illustrates a perspective view of a rechargeable battery according to an exemplary embodiment.
Figure 2:
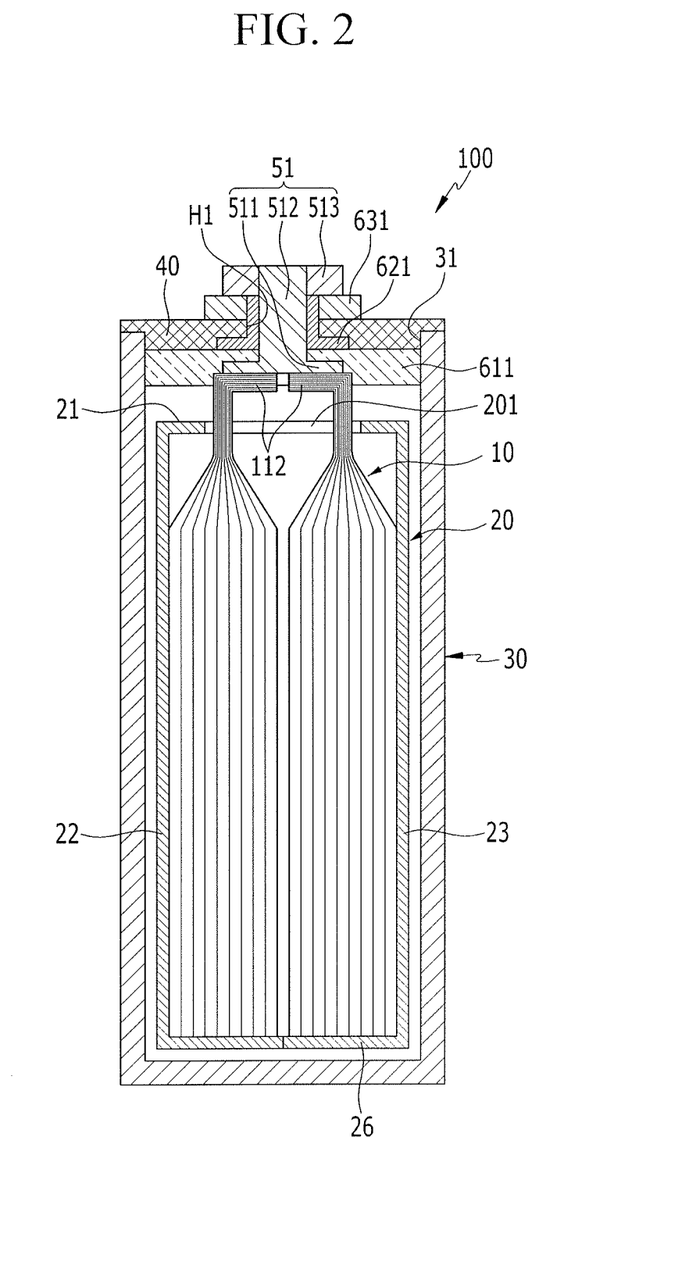
FIG. 2 illustrates a cross-sectional view taken along line II-II of FIG. 1.
Figure 3:
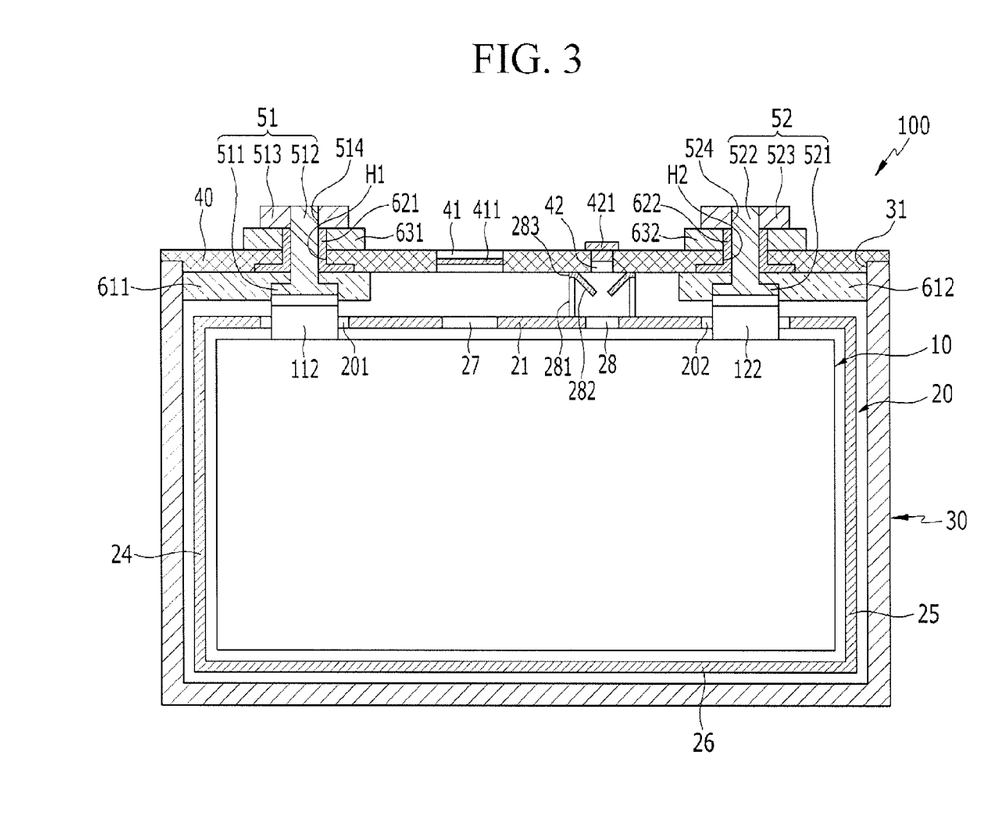
FIG. 3 illustrates a cross-sectional view taken along line of FIG. 1.

FIG. 1 illustrates a perspective view of a rechargeable battery according to an exemplary embodiment, FIG. 2 illustrates a cross-sectional view taken along line II-II of FIG. 1, and FIG. 3 illustrates a cross-sectional view taken along line of FIG. 1.

Referring to FIG. 1 and FIG. 3, a rechargeable battery 100 according to an exemplary embodiment may include an electrode assembly 10 for charging and discharging a current, an insulating case 20 for electrically insulating and accommodating the electrode assembly 10, a case 30 for accommodating the insulating case 20, and a cap plate 40 combined to an opening of a case 30 to close and seal the opening.

Figure 4:
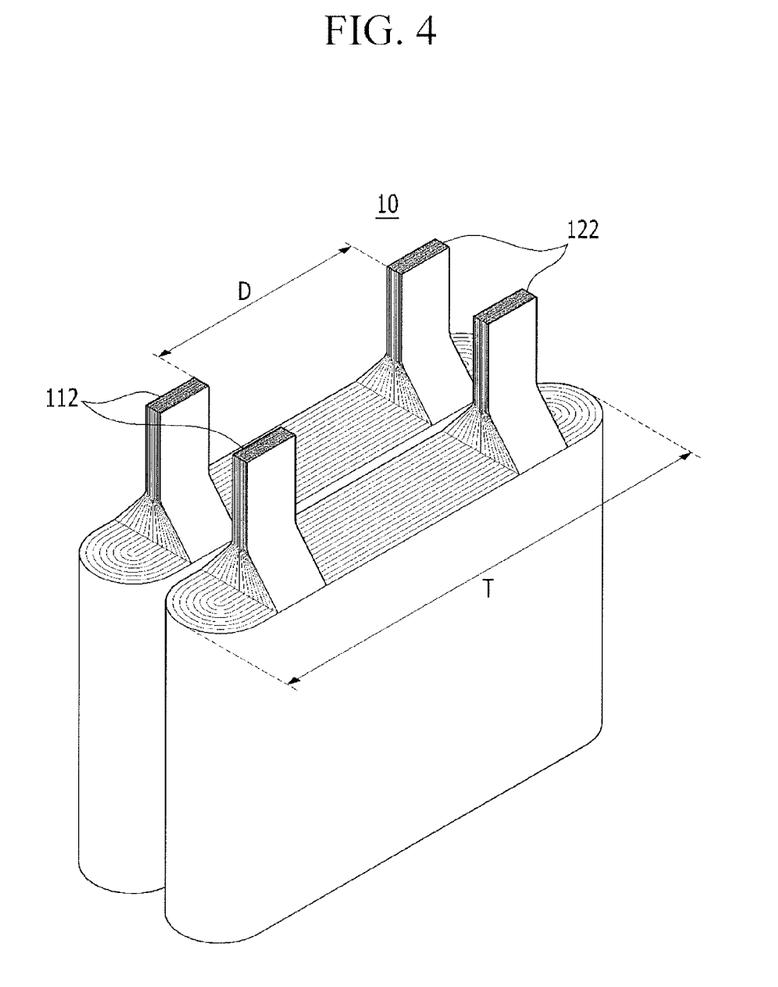
FIG. 4 illustrates a perspective view of an electrode assembly applied to FIG. 2.
Figure 5:
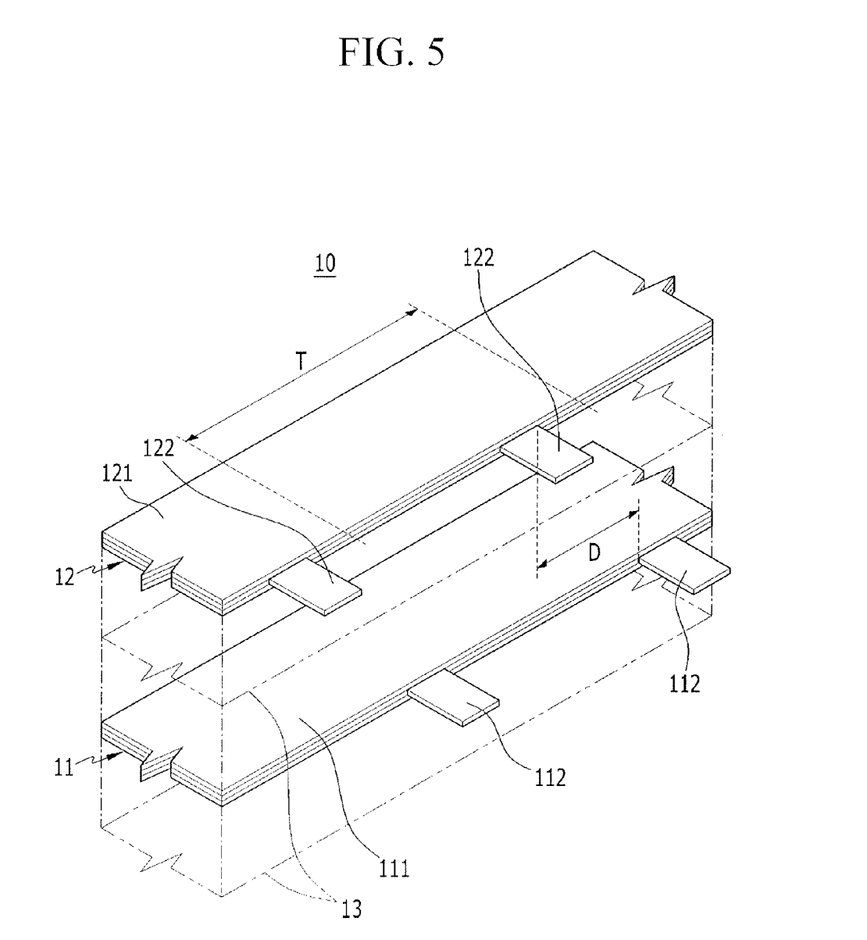
FIG. 5 illustrates an exploded perspective view of an electrode assembly illustrated in FIG. 4.

FIG. 4 illustrates a perspective view of electrode assembly applied to FIG. 2, and FIG. 5 illustrates an exploded perspective view of an electrode assembly illustrated in FIG. 4. Referring to FIG. 4 and FIG. 5, the electrode assembly 10 may be provided with a first electrode 11 (e.g., a negative electrode) and a second electrode 12 (e.g., a positive electrode) at opposite sides of a separator 13 as an electrical insulator, and is formed, e.g., by spirally winding the negative electrode 11, the separator 13, and the positive electrode 12.

The electrode assembly 10 may be a single electrode assembly (not shown), but two electrode assemblies are formed in the exemplary embodiment. The electrode assembly 10 may have a shape of a plate, e.g., with opposite oval ends (upper and lower ends of FIG. 4) to be accommodated in the case 30.

The negative and positive electrodes 11 and 12 may respectively include coated regions 111 and 121 where an active material is coated on a current collector formed of a metal foil (e.g., copper (Cu) or aluminum (Al) foil), and uncoated region tabs 112 and 122 where the active material is not coated thereon in order to expose the current collector. The uncoated region tabs 112 and 122 are disposed at one end of the spirally-wound electrode assembly 10 and spaced apart from each other by a distance D from one end thereof within the one winding range T of the electrode assembly 10.

For example, the uncoated region tabs 112 of the negative electrode 11 may be disposed at one side of one end of the spirally wound electrode assembly 10, and the uncoated region tabs 122 of the positive electrode 12 are disposed at the other side of one end of the spirally wound electrode assembly 10 and spaced apart from the uncoated region tabs 112 of the negative electrode 11 by the distance D.

Accordingly, when the negative electrode 11 and the positive electrode 12 are spirally wound, the uncoated region tabs 112 of the negative electrode 11 are disposed to the left of one end of the spirally-wound electrode assembly 10 (upper end of FIG. 4), and the uncoated region tabs 122 of the positive electrode 12 are disposed to the right of the same end of the electrode assembly 10 (upper end of FIG. 4).

Thus, for the negative and positive electrodes 11 and 12, as areas of the coated regions 111 and 121 are maximized and areas of the uncoated region tabs 112 and 122 are minimized, charging capacity of the electrode assembly 10 may be increased.

In addition, each of the uncoated region tabs 112 and 122 may be provided by each winding of the electrode assembly 10 so that currents for charging and discharging may flow, thereby reducing the entire resistance of the uncoated region tabs 112 and 122. Accordingly, the electrode assembly 10 may output a high current through the uncoated region tabs 112 and 122.

Figure 6:
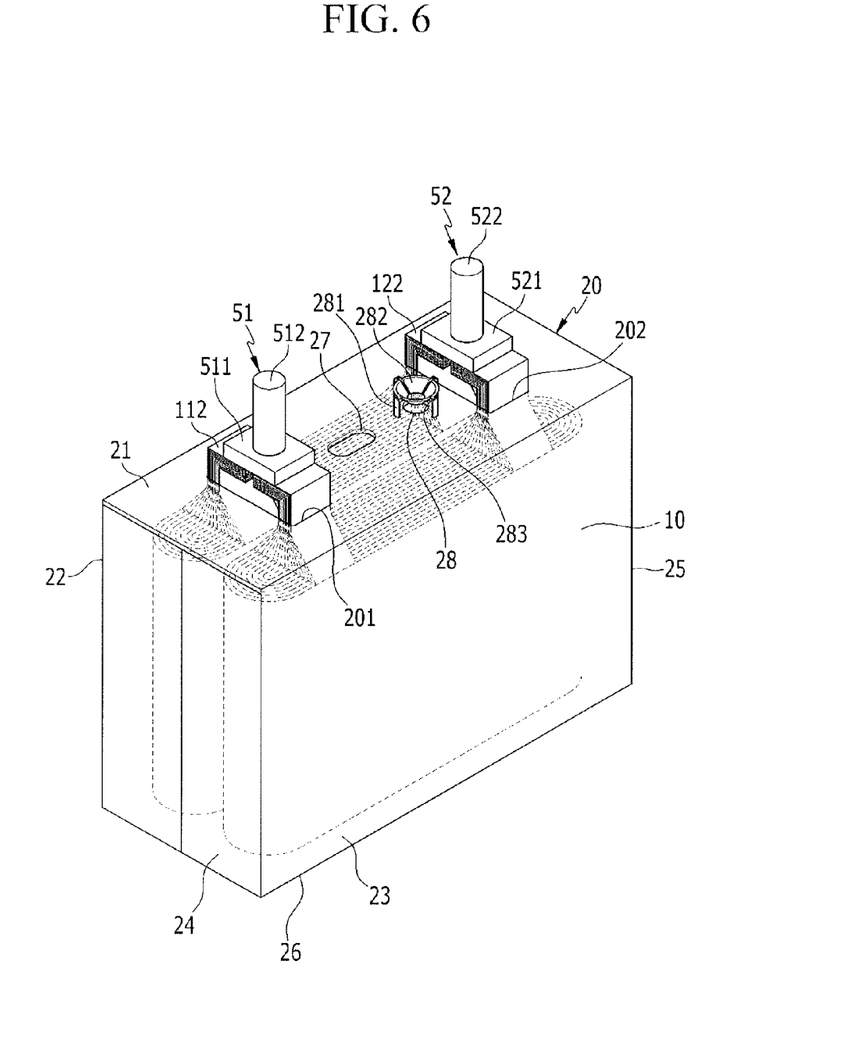
FIG. 6 illustrates a perspective view of a state in which an insulating case is combined to an electrode assembly of FIG. 2.

FIG. 6 illustrates a perspective view of a state in which an insulating case is combined to an electrode assembly of FIG. 2. Referring to FIG. 2 to FIG. 4, and FIG. 6, two electrode assemblies 10 may be disposed in parallel to be electrically connected to each other through first and second electrode terminals 51 and 52.

For example, in the two electrode assemblies 10, the uncoated region tab 112 of the negative electrode 11 of one electrode assembly may face the uncoated region tab 112 of the negative electrode 11 of the other electrode assembly and may be connected to each other through a first electrode terminal 51. The uncoated region tab 122 of the positive electrode 12 of one electrode assembly may face the other of the uncoated region tab 122 of the positive electrode 12 of the other electrode assembly and may be connected to each other through a second electrode terminal 52.

The insulating case 20 may be provided with tab holes 201 and 202 corresponding to the uncoated region tabs 112 and 122, and the uncoated region tabs 112 and 122 of the electrode assembly 10 accommodated in the insulating case 20 are respectively drawn out of the insulating case 20 through the tab holes 201 and 202.

For example, the insulating case 20 may electrically insulate the accommodated electrode assembly 10 from the case 30, and enable the uncoated region tabs 112 and 122 to be electrically connected to the first and second electrode terminals 51 and 52 (e.g., negative and positive electrode terminals) through the tab holes 201 and 202.

Referring back to FIG. 1 to FIG. 3, the case 30 may accommodate the insulating case 20 to electrically insulate and accommodate the electrode assembly 10, may form an exterior of the rechargeable battery 100, and may provide mechanical strength for the rechargeable battery 100.

The case 30 sets or establishes a space for accommodating one electrode assembly or two electrode assemblies 10 with a plate shape, e.g. For instance, the case 30 may have a substantially cuboid shape, e.g., and be provided with a quadrangular opening 31, e.g., at one side into which the electrode assembly 10 may be inserted.

The cap plate 40 may be combined to the opening 31 of the case 30 to close and seal the case 30, and be provided with two terminal holes H1 and H2. For example, the negative and positive electrode terminals 51 and 52 may be installed in the terminal holes H1 and H2. The case 30 and the cap plate 40 may be formed of aluminum, e.g., such that they may be welded to each other in the opening 31.

In addition, the cap plate 40 may be further provided with a vent hole 41 and an electrolyte injection opening 42. The vent hole 41 may be closed and sealed by a vent plate 411 to discharge internal pressure caused by a gas that is generated by the charging and discharging operations of the electrode assembly 10 inside the rechargeable battery 100.

When the internal pressure of the rechargeable battery 100 reaches a predetermined pressure, the vent plate 411 may be ruptured to open the vent hole 41, thereby discharging the gas and the internal pressure. The vent plate 411 may have a notch 412 for inducing the rupture.

After the cap plate 40 is combined and welded to the case 30, the electrolyte injection opening 42 may allow the electrolyte solution to be injected into the case 30. After the electrolyte solution is injected, the electrolyte injection opening 42 is sealed by a sealing cap 421.

Referring back to FIG. 2, FIG. 3, and FIG. 6, the negative and positive electrode terminals 51 and 52 may be respectively connected to the uncoated region tabs 112 and 122 of the electrode assembly 10 to allow the current to be discharged from or charged to the electrode assembly 10.

In an internal space set by the case 30 and the cap plate 40, the insulating case 20 may correspond to inner surfaces of the case 30 and the cap plate 40 and accommodate the electrode assembly 10.

Figure 7:
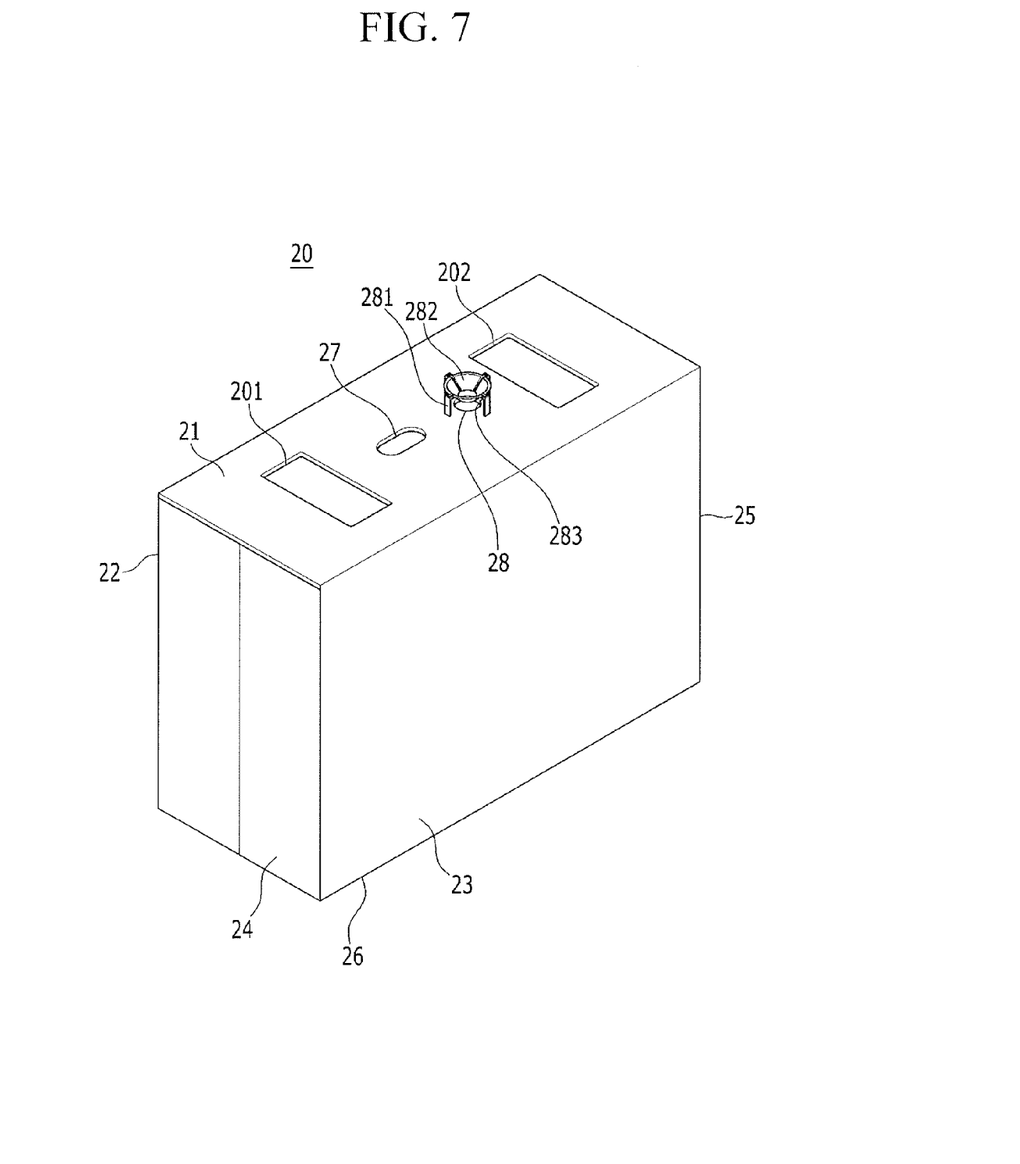
FIG. 7 illustrates a perspective view of an insulating case applied to FIG. 6.
Figure 8:
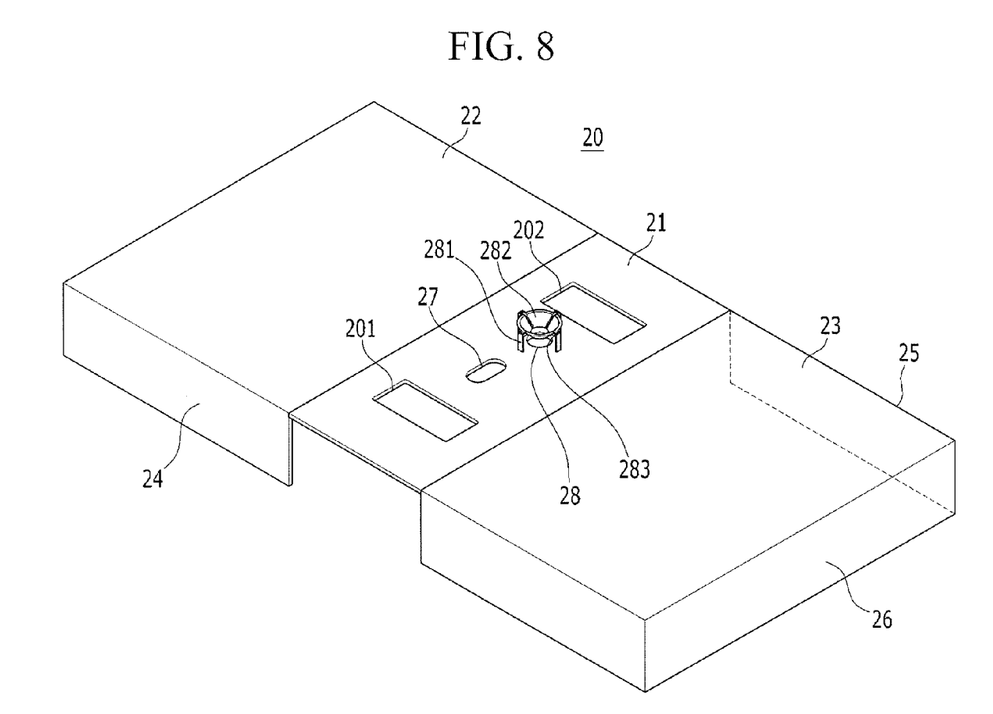
FIG. 8 illustrates a perspective view of an unfolded insulating case illustrated in FIG. 7.

FIG. 7 illustrates a perspective view of an insulating case applied to FIG. 6, and FIG. 8 illustrates a perspective view of an unfolded insulating case illustrated in FIG. 7. Referring to FIG. 6 to FIG. 8, the insulating case 20 may be formed as one member and bent to accommodate the electrode assembly 10.

For example, the insulating case 20 may be injection-molded with an electrically insulating material and then bent, thereby electrically insulating the outside of the electrode assembly 10 from the inside of the case 30.

For example, the insulating case 20 may be bent as one member and may include a first surface portion 21, a second surface portion 22, a third surface portion 23, a fourth surface portion 24, a fifth surface portion 25, and a sixth surface portion 26, which substantially form a cuboid.

The first surface portion 21 may face the inside of the cap plate 40 and provide tab holes 201 and 202. The second and third surface portions 22 and 23 may be vertically bent from the first surface portion 21 to face wide opposite sides of the electrode assembly 10 and to face wide side walls of the case 30.

The fourth surface portion 24, the fifth surface portion 25, and the sixth surface portion 26 may protrude in a vertical direction from outer ends of the second surface portion 22 and the third surface portion 23, and be attached to each other when the second and third surface portions 22 and 23 are bent from the first surface portion 21.

The fourth surface portion 24, the fifth surface portion 25, and the sixth surface portion 26 that are attached to each other at opposite lateral sides may face lateral surfaces of the electrode assembly 10, and portions opposite to the uncoated region tabs 112 and 122 may face narrow side walls and a bottom of the case 30. Accordingly, the insulating case 20 accommodate the electrode assembly 10 in the six surface portions 21 through 26, such that the electrode assembly 10 may be insulated from the cap plate 40 and the case 30.

The insulating case 20 may be provided with an internal vent hole 27 in the first surface portion 21. Since the internal vent hole 27 may correspond to the vent hole 41 provided in the cap plate 40, it allows the internal pressure, which increases by gas generated in the electrode assembly 10, to be delivered to the vent hole 41 and to be discharged therethrough.

In addition, the insulating case 20 may be provided with an internal electrolyte injection opening 28, a pillar 281, and a valve flap 282 in the first surface portion 21. Since the internal electrolyte injection opening 28 may correspond to the electrolyte injection opening 42 provided in the cap plate 40, it allows the electrolyte solution passing through the electrolyte injection opening 42 to be injected into the insulating case 20.

The pillar 281 may protrude toward the inner side of the cap plate 40 around the internal electrolyte injection opening 28. The valve flap 282 may be connected to the pillar 281 by a hinge 283 or a notch, such that it rotates via the hinge 283 or the notch to induce the injection of the electrolyte solution, and/or facilitate movement of the electrolyte solution, and to block back-flowing of the electrolyte solution.

The pillar 281 and the valve flap 282 may be integrally formed with the insulating case 20. Alternatively, they may be separately manufactured to be attached to a periphery of the internal electrolyte injection opening.

Referring back to FIG. 2, FIG. 3 and FIG. 6, the negative and positive electrode terminals 51 and 52 may be installed in the terminal holes H1 and H2 of the cap plate 40, and may be electrically connected to the electrode assembly 10 through the uncoated region tabs 112 and 122. The uncoated region tabs 112 and 122 may be drawn out of the insulating case 20 through the tab holes 201 and 202, and may be connected to the negative and positive electrode terminals 51 and 52 outside the insulating case 20.

In this case, the uncoated region tabs 112 and 122 may penetrate the tab holes 201 and 202 toward the cap plate 40, and after penetrating them, may be bent parallel to the cap plate 40 to be welded to the negative and positive electrode terminals 51 and 52.

The negative and positive electrode terminals 51 and 52 may have a same structure. Referring to the drawings to describe the structure, the negative and positive electrode terminals 51 and 52 may include internal plates 511 and 521, rivets 512 and 522, and external plates 513 and 523.

The internal plates 511 and 521 may be integrally formed wider than the rivets 512 and 522 to be welded with wide areas of the uncoated region tabs 112 and 122, and disposed inside the cap plate 40. In this case, the uncoated region tab (112, 112; 122, 122) of the two electrode assemblies (10, 10) may be bent and welded, e.g., to the internal plates 511 and 521.

The rivets 512 and 522 may be connected to the internal plates 511 and 521, and protrude out of the cap plate 40 through the terminal holes H1 and H2. The external plates 513 and 523 may be mechanically and electrically connected to the rivets 512 and 522 at an outer surface of the cap plate.

Accordingly, the electrode assembly 10 may be drawn out of the case 30 through the uncoated region tabs 112 and 122 and the negative and positive electrode terminals 51 and 52. In addition, since the uncoated region tabs 112 and 122 may be directly connected to the negative and positive electrode terminals 51 and 52, a structure for drawing the electrode assembly 10 out of the case 30 is simplified.

Meanwhile, internal insulating members 611 and 612 and gaskets 621 and 622 may be interposed between the negative and positive electrode terminals 51 and 52 and internal the cap plate 40 to electrically insulate the negative and positive electrode terminals 51 and 52 from the cap plate 40.

Further, since one side of each of the internal insulating members 611 and 612 may be attached to the cap plate 40 while the other side partially encloses the internal plates 511 and 521 of the negative and positive electrode terminals 51 and 52 and the rivets 512 and 522, a connecting structure of the negative and positive electrode terminals 51 and 52 and the uncoated region tabs 112 and 122 may be stabilized.

The gaskets 621 and 622 may be further extended between the rivets 512 and 522 of the negative and positive electrode terminals 51 and 52 and the inner sides of the terminal holes H1 and H2 of the cap plate 40, thereby sealing and electrically insulating between the rivets 512 and 522 and the terminal holes H1 and H2 of the cap plate 40.

The gaskets 621 and 622 may be further extended between the internal insulating members 611 and 612 and the inner side of the cap plate 40 to further seal between the internal insulating members 611 and 612 and the cap plate 40.

For example, the gaskets 621 and 622 may prevent the electrolyte solution from leaking through the terminal holes H1 and H2 in a structure in which the negative and positive electrode terminals 51 and 52 are installed in the cap plate 40. In addition, the gaskets 621 and 622 may be further extended between external insulating members 631 and 632 and the rivets 512 and 522 to further seal therebetween.

After the rivets 512 and 522 are inserted into the terminal holes H1 and H2, with the gaskets 621 and 622 interposed therebetween, and the rivets 512 and 522 are inserted into coupling holes 514 and 524 of the external plates 513 and 523, with the external insulating members 631 and 632 interposed therebetween, the vicinities of the coupling hole 514 and 524 may be caulked or welded, e.g., to allow the rivets 512 and 522 to be fixed to the external plates 513 and 523. As such, the negative and positive electrode terminals 51 and 52 may be installed in the cap plate 40.

Figure 9:
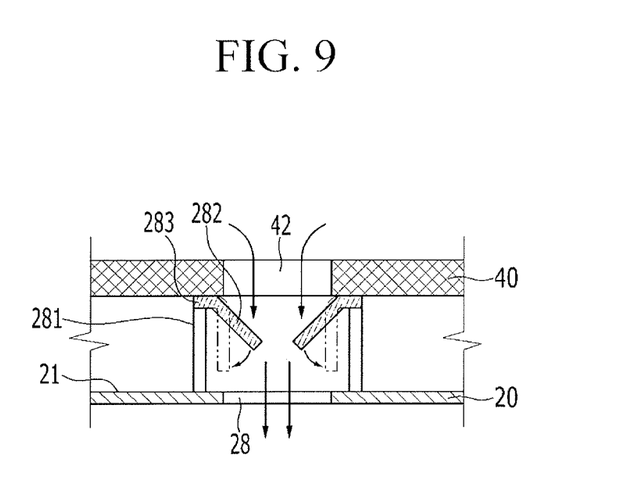
FIG. 9 illustrates a cross-sectional view of a state of injecting an electrolyte solution into an electrolyte injection opening in a rechargeable battery according to a first exemplary embodiment.
Figure 10:
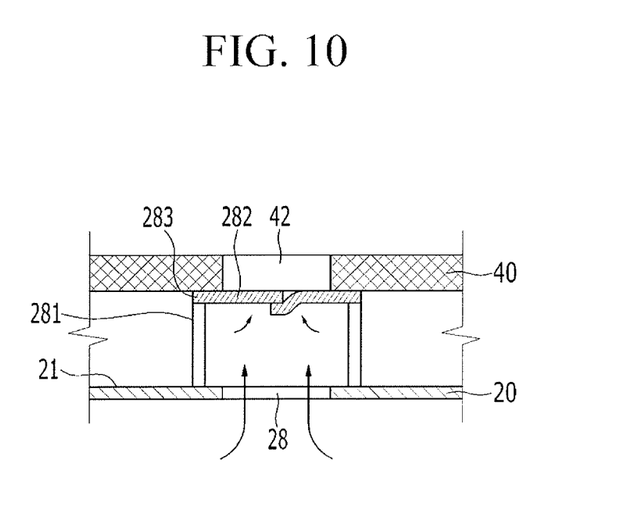
FIG. 10 illustrates a cross-sectional view of a state of blocking an electrolyte solution from flowing backward into an electrolyte injection opening in the rechargeable battery of FIG. 9.
Figure 11:
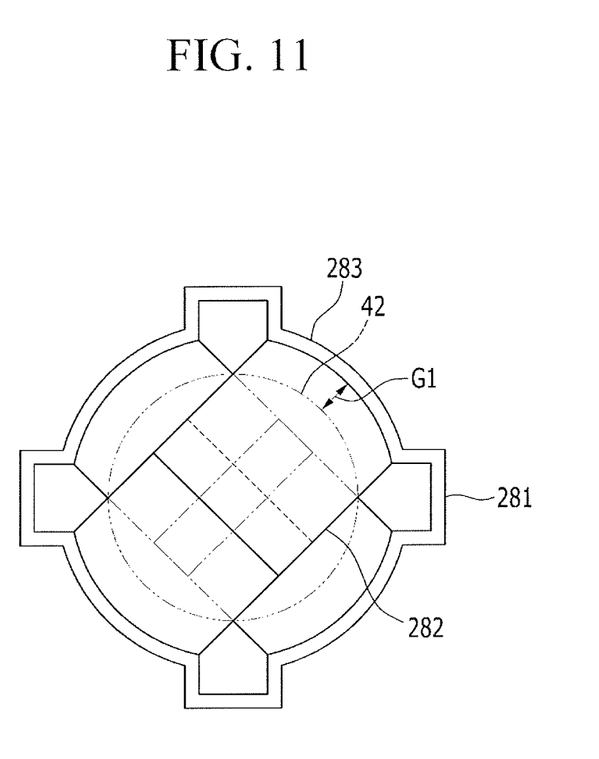
FIG. 11 illustrates a top plan view of FIG. 10.

FIG. 9 illustrates a cross-sectional view of a state injecting an electrolyte solution into an electrolyte injection opening in a rechargeable battery according to an exemplary embodiment, FIG. 10 illustrates a cross-sectional view of a state blocking an electrolyte solution from flowing backward into an electrolyte injection opening in the rechargeable battery of FIG. 9, and FIG. 11 illustrates a top plan view of FIG. 10.

Referring to FIG. 9 to FIG. 11, a plurality of valve flaps 282 may be formed around the internal electrolyte injection opening 28 along a circumferential direction of the internal electrolyte injection opening 28. For example, a plurality of pillars 281 may be provided around the internal electrolyte injection opening 28 at one side on which the uncoated region tabs 112 and 122 and the negative and positive electrode terminals 51 and 52 are connected. The valve flaps 282 may block or obstruct flow of electrolyte solution between the internal electrolyte injection opening 28 and tab holes 201 and 202.

An electrolyte solution accommodating line, which connects the pillars 281 and the valve flaps 282 to accommodate the injected electrolyte solution, maintains a predetermined gap G1 from a circumference of an electrolyte injection opening 42 (refer to FIG. 11). The gap G1 facilitates an arrangement between the electrolyte injection opening 42 of the cap plate 40 and the internal electrolyte injection opening 28 of the insulating case 20 even when there is some misalignment between the openings.

When the electrolyte solution is injected into the electrolyte injection opening 42, since the plurality of valve flaps 282 are pushed by the injected electrolyte solution, they are disposed to be tilted from the hinge 283 toward the internal electrolyte injection opening 28. Accordingly, the plurality of valve flaps 282 may have a wide path or passage at a side of the electrolyte injection opening 42 and a narrow path or passage at a side of the internal electrolyte injection opening 28 to facilitate injection of the electrolyte solution (refer to FIG. 9).

When the electrolyte solution flows backward from the internal electrolyte injection opening 28, the valve flaps 282 are pushed by the back-flowing electrolyte solution to be rotated at the hinge 283, thereby closing the electrolyte injection opening 42. In this case, the hinge 283 that connects the valve flaps 282 to the pillar 281 is supported by the cap plate 40 facing the insulating case 20.

When the electrolyte solution flows backward from the internal electrolyte injection opening 28, since the valve flaps 282 are formed between the plurality of pillars 281, they may overlap each other at the electrolyte injection opening 42. The overlapped valve flaps 282 may completely close the electrolyte injection opening 42 (refer to FIG. 10 and FIG. 11).

The pillar 281 and the valve flaps 282 may be provided in the first surface portion 21 of the insulating case 20 to block an interval between the electrolyte injection opening 42 and the tab holes 201 and 202 that are provided to be adjacent to each other. Accordingly, when the rechargeable battery 100 is crushed, it is possible to prevent a short circuit between the peripheral portion of the electrolyte injection opening 42 inside the internal cap plate 40 and the uncoated region tabs 112 and 122.

Hereinafter, a rechargeable battery of another exemplary embodiment will be described. For better understanding and convenience, same configuration as the above-described exemplary embodiments will be omitted and different configurations will be described.

Figure 12:
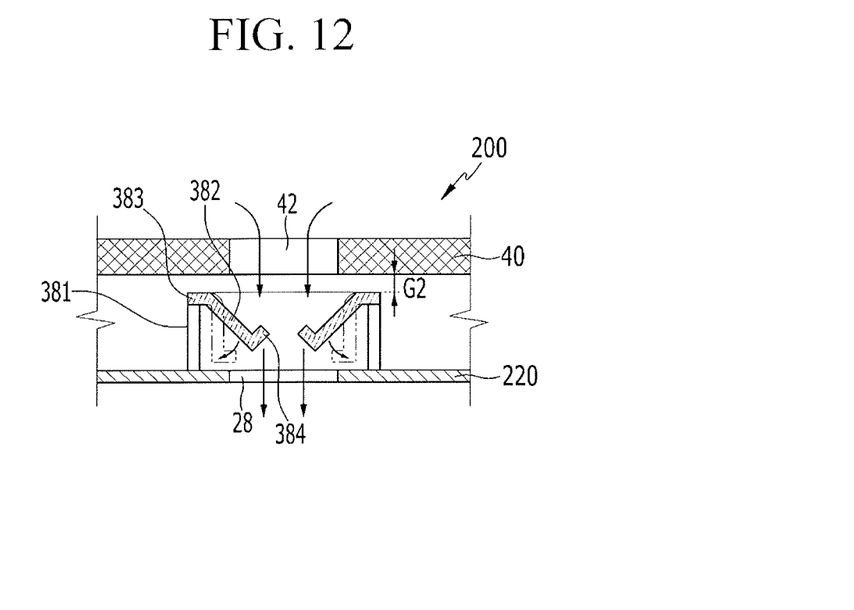
FIG. 12 illustrates a cross-sectional view of a state of injecting an electrolyte solution into an electrolyte injection opening in a rechargeable battery according to another exemplary embodiment.
Figure 13:
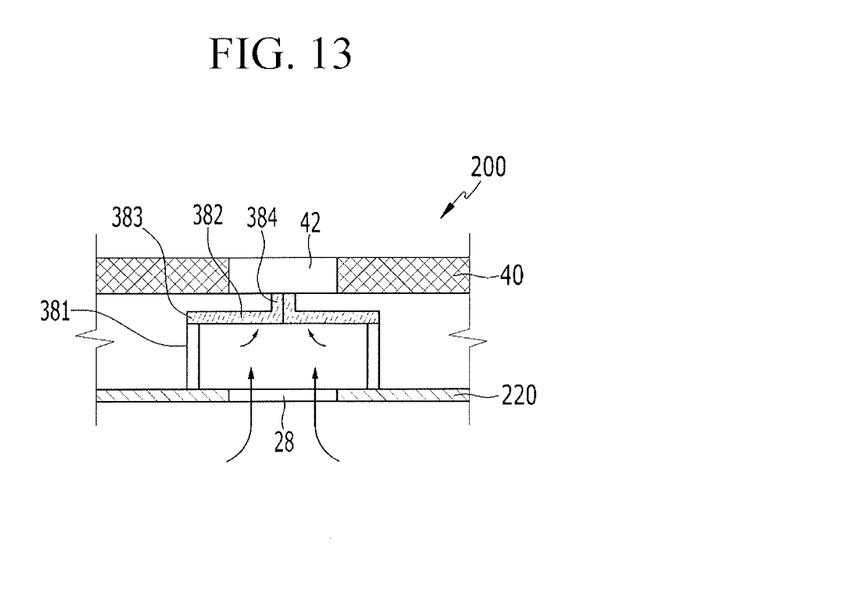
FIG. 13 illustrates a cross-sectional view of a state of blocking an electrolyte solution from flowing backward into an electrolyte injection opening in the rechargeable battery of FIG. 12.

FIG. 12 illustrates a cross-sectional view of a state injecting an electrolyte solution into an electrolyte injection opening in a rechargeable battery according to another exemplary embodiment, and FIG. 13 illustrates a cross-sectional view of a state blocking an electrolyte solution from flowing backward into an electrolyte injection opening in the rechargeable battery of FIG. 12.

Referring to FIG. 12 and FIG. 13, in a rechargeable battery 200 of another exemplary embodiment, a hinge 383 connecting valve flaps 382 to a pillar 381 may be spaced apart from the cap plate 40 facing an insulating case 220 by a predetermined gap G2.

The valve flaps 382 may be provided with a protrusion 384 corresponding to the gap G2 at a stepped portion thereof. As such, when the electrolyte solution flows backward from the internal electrolyte injection opening 28 to the electrolyte injection opening 42, the valve flaps 382 are pushed by the hack-flowing electrolyte solution, and then may be supported by the protrusion 384 at the electrolyte injection opening 42.

Since the hinge 383 may be spaced apart from the cap plate 40, when the valve flaps 382 are pushed up by the electrolyte solution that flows backward to close the electrolyte injection opening 42, they may smoothly rotate at the hinge 383.

By way of summation and review, a rechargeable battery may include an electrode assembly for performing charging and discharging operations, an insulating case for electrically insulating the electrode assembly, a case for accommodating the electrode assembly insulated by the insulating case, a cap plate combined to an opening of the case, and an electrode terminal through which the electrode assembly is draw out of the cap plate.

The cap plate may be provided with an electrolyte injection opening, which may allow an electrolyte solution to be injected into the case after combining the case with the cap plate. Since the electrolyte injection opening may have a small diameter, the electrolyte solution may overflow when an injection speed of the electrolyte solution is high.

If a diameter of the electrolyte injection opening is increased for smoothly injecting the electrolyte solution, a periphery around the electrolyte injection opening inside the cap plate will be adjacent to an uncoated region tab of an electrode. Thus, when there is a crush occurrence or crush evaluation of the rechargeable battery, a short circuit may occur between the inside of the cap plate (i.e., at the periphery around the electrolyte injection opening) and the uncoated region tab of the electrode.

In addition, although a size of the electrolyte injection opening may be appropriately adjusted, there may be a misalignment between an internal electrolyte injection opening provided in the insulating case and the electrolyte injection opening provided in the cap plate due to a distribution or accumulation of assembly errors occurring when the case, the cap plate, and the insulating case are assembled.

Exemplary embodiments provide a rechargeable battery that may ensure a smooth injection path of an electrolyte solution regardless of an injection speed of the electrolyte solution, and may prevent the electrolyte solution from flowing backward and overflowing from the inside of a case to an electrolyte injection opening.

Exemplary embodiments may prevent a short circuit from occurring between the inside of a cap plate (i.e., at a periphery around the electrolyte injection opening) and an uncoated region tab of an electrode that are adjacent to each other when there is a crush evaluation or occurrence.

A rechargeable battery of the exemplary embodiments may also facilitate an arrangement and alignment of an electrolyte injection opening of a cap plate and an internal electrolyte injection opening of an insulating case.

In the exemplary embodiments, since a pillar and a valve flap around the internal electrolyte injection opening of the insulating case may be provided to ensure a smooth injection path of the electrolyte solution injection, it is possible to smoothly guide the injection of the electrolyte solution and prevent an overflow of the electrolyte solution regardless of the injection speed of the electrolyte solution. For example, according to exemplary embodiments, the electrolyte solution may not back flow from the inside of the case to the electrolyte injection opening during injection of the electrolyte solution.

The pillar and the valve flap may be provided on the insulating case to correspond to the electrolyte injection opening between the cap plate and the electrode assembly and to block an interval between the electrolyte injection opening and a tab hole that are adjacent to each other. Thus, it may be possible to prevent a short circuit from occurring between the inside of the cap plate (i.e., at the periphery around the electrolyte injection opening) and the uncoated region tab of the electrode when there is a crush occurrence or crush evaluation of the rechargeable battery.

Since an electrolyte solution accommodating line for connecting the pillar and the valve flap may maintain an outer circumferential line of the electrolyte injection opening with a gap G1 therebetween, it is possible to easily arrange the electrolyte injection opening of the cap plate and the internal electrolyte injection opening of the insulating case.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery comprising:
   an electrode assembly including an electrode provided with a coated region and an uncoated region tab at opposite sides of a separator;
   an insulating case to accommodate and electrically insulate the electrode assembly;
   a case to accommodate the insulating case; and
   a cap plate including an electrolyte injection opening for injecting an electrolyte solution and combined with the case,
   wherein the insulating case includes:
   an internal electrolyte injection opening corresponding to the electrolyte injection opening;
   a pillar around the internal electrolyte injection opening protruding toward an inner side of the cap plate; and
   a valve flap that rotates via a hinge, induces injection of the electrolyte solution, and prevents backflow of the electrolyte solution.

2. The rechargeable battery as claimed in claim 1, wherein the valve flap is a plurality of valve flaps around the internal electrolyte injection opening and along a circumferential direction of the internal electrolyte injection opening.

3. The rechargeable battery as claimed in claim 2, wherein an electrolyte solution accommodating line connects the pillar and the valve flaps to accommodate the injected electrolyte solution and maintains a predetermined gap from a circumference of the electrolyte injection opening.

4. The rechargeable battery as claimed in claim 2, wherein the plurality of valve flaps are disposed to be tilted from the hinge toward the internal electrolyte injection opening and to have a wide passage at a side of the electrolyte injection opening and a narrow passage at a side of the internal electrolyte injection opening to induce the injection of the electrolyte solution when the electrolyte solution is injected into the electrolyte injection opening.

5. The rechargeable battery as claimed in claim 4, wherein when the electrolyte solution flows backward from the internal electrolyte injection opening, the backflow of the electrolyte solution causes the plurality of valve flaps to close the electrolyte injection opening.

6. The rechargeable battery as claimed in claim 5, wherein the hinge connects the plurality of valve flaps to the pillar and is supported by the cap plate, and the cap plate faces the insulating case.

7. The rechargeable battery as claimed in claim 6, wherein the pillar is a plurality of pillars, and
   the plurality of valve flaps are between the plurality of pillars and overlap each other at the electrolyte injection opening when the electrolyte solution flows backward from the internal electrolyte injection opening.

8. The rechargeable battery as claimed in claim 5, wherein the hinge connects the plurality of valve flaps to the pillar and is spaced apart from the cap plate by a predetermined gap, and the cap plate faces the insulating case.

9. The rechargeable battery as claimed in claim 8, wherein the plurality of valve flaps include a protrusion at a stepped portion thereof corresponding to the predetermined gap,
   the pillar is a plurality of pillars, and
   the plurality of valve flaps are between the plurality of pillars and are supported by the protrusion at the electrolyte injection opening when the electrolyte solution flows backward from the internal electrolyte injection opening.

10. The rechargeable battery as claimed in claim 1, wherein
    in an internal space of the case including the cap plate, the insulating case is toward a bottom and lateral walls of the case and an inner side of the cap plate to accommodate the electrode assembly, and the insulating case is provided with a tab hole, corresponding to the uncoated region tab, and an internal vent hole, corresponding to a vent hole of the cap plate.

11. The rechargeable battery as claimed in claim 10, wherein
    the uncoated region tab is connected to an electrode terminal provided in a terminal hole of the cap plate outside of the insulating case.

12. The rechargeable battery as claimed in claim 11, wherein
    the pillar is a plurality of pillars provided around the internal electrolyte injection opening on one side, the uncoated region tab and the electrode terminal also connected on the one side, and
    the valve flap is a plurality of valve flaps that block between the internal electrolyte injection opening and the tab hole.

13. The rechargeable battery as claimed in claim 1, wherein
    the insulating case is one member bent to accommodate the electrode assembly, and is provided with the pillar and the valve flap at one surface thereof.

14. The rechargeable battery as claimed in claim 13, wherein
    the insulating case includes:
    a first surface portion that faces the cap plate and is provided with the internal electrolyte injection opening, the pillar, and the valve flap;
    a second surface portion and a third surface portion that extend from and are bent from the first surface portion to face opposite sides of the electrode assembly; and
    a fourth surface portion, a fifth surface portion, and a sixth surface portion that protrude from outside the second surface portion and the third surface portion, and face a lateral surface of the electrode assembly and a portion opposite to the uncoated region tab.

\* \* \* \* \*